E. B. MOSELEY.
FILING APPLIANCE.
APPLICATION FILED JUNE 20, 1911.

1,170,312.

Patented Feb. 1, 1916.
4 SHEETS—SHEET 1.

Inventor
Emerson B Moseley
By Harry Frease
Attorney

Witnesses
R. F. Kohl
Mary G. Cavanaugh

E. B. MOSELEY.
FILING APPLIANCE.
APPLICATION FILED JUNE 20, 1911.

1,170,312.

Patented Feb. 1, 1916.
4 SHEETS—SHEET 2.

Witnesses
R. F. Kohl
Mary A. Cavanaugh

Inventor
Emerson B. Moseley
By Harry Frease
Attorney

E. B. MOSELEY.
FILING APPLIANCE.
APPLICATION FILED JUNE 20, 1911.

1,170,312.

Patented Feb. 1, 1916.
4 SHEETS—SHEET 3.

Witnesses
R. F. Kohl
Mary A. Cavanaugh

Inventor
Emerson B. Moseley
By
Harry Frease.
Attorney

E. B. MOSELEY.
FILING APPLIANCE.
APPLICATION FILED JUNE 20, 1911.

1,170,312.

Patented Feb. 1, 1916.
4 SHEETS—SHEET 4.

Inventor
Emerson B. Moseley

Witnesses

By Harry Frease
Attorney

UNITED STATES PATENT OFFICE.

EMERSON B. MOSELEY, OF ALLIANCE, OHIO, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

FILING APPLIANCE.

1,170,312.  Specification of Letters Patent.  Patented Feb. 1, 1916.

Application filed June 20, 1911. Serial No. 634,268.

*To all whom it may concern:*

Be it known that I, EMERSON B. MOSELEY, a citizen of the United States, residing at Alliance, in the county of Stark and State of Ohio, have invented certain new and useful Improvements in Filing Appliances, of which the following is a specification.

The invention relates to an appliance specially adapted for filing bills of sales or accounts, as of a retail merchant, and more particularly to that class of appliances containing a series of frames or leaves normally located uprightly face to face, in a rectangular pack, the frames being hinged or jointed together at the lower ends, so that they can be rotated forward to a prone position, face to face, in a rectangular pack, which rotation exposes and gives access to the faces of the several frames.

One object of the invention is to provide means for connecting and gearing the pack of frames so that, when one or more frames are folded forward to a prone position, the prone frames will be moved rearward a distance equal to the depth of the particular number of frames which have been rotated; thus always bringing the rear ends of the prone frames in the plane of the forward face of the foremost upright frame. In the present embodiment of the invention, this object is attained by providing a sliding connection between the rearmost frame and the case, so that the upright frames may move up and down, and by providing a swinging support depending from the case for the lower end of the foremost frame, so that the same may swing or oscillate rearward and forward as the several frames are rotated forward and rearward.

A further object of the invention is to provide means for counterbalancing the frames in their several positions, so that they are normally held either in the upright or in the prone position when placed therein, and will singly or collectively tend to return to the upright position when started upward from the prone position. In the present embodiment of the improvement, this object is attained by providing a depressible support, with roller bearings, for the forward face of the frame; and by providing a suitable stop for this support and a spring connection between the support and the rearmost frame, so that, when the foremost frame is rotated forward to the prone position, the support will be depressed to the stop against the tension of the connecting spring, and, as the upright leaves are raised, the tension of the connecting spring is correspondingly increased to counterbalance the weight of the prone frames; and, as the prone frames move rearward on the support, they are sustained at a point correspondingly farther from their jointed ends, so that the connecting springs serve to draw them to an upright position when started upward.

A further object of the invention is to provide a hinged connection between the jointed ends of the frames, which will permit these ends to slightly separate when necessary to accommodate a greater number of bills than can be filed in the normal interval between the frames; and, in the present embodiment, this object is attained by providing a hinge having an intervening link-plate pivoted below to the edge of one frame and above to the face of the adjoining frame, so that the leaves may separate by the swinging of the intervening link-plate on its pivots. Coupled with the expansible joint, thus formed, may be provided one or more expansion springs extending through apertures in the lower ends of the frames to normally hold the same closed together.

A further feature of the invention is to provide wire-spring clips which can be conveniently connected to the frames, with their connected ends bent to form springs for holding the body of the clip at varying intervals from the frame to receive and retain bunches of bills of varying thicknesses.

A further feature of the invention pertains to a proper separation of the bunches of bills held by the spring clips in each frame, and consists in providing a series of posts alined between the several clips, so that the bills may be readily grasped at the sides of the bunches by inserting the fingers between the posts. And a final feature of the invention pertains to means for indexing the contents of the several frames, and consists in providing an overhanging plate having a series of depending index flanges arranged in echelon, so that each flange is located above a corresponding upright frame to indicate the contents thereof.

The present embodiment of the several features of the invention, thus set forth in general terms, is illustrated in the accompanying drawings, forming part hereof, in which—

Similar numerals refer to similar parts throughout the drawings.

Figure 1:
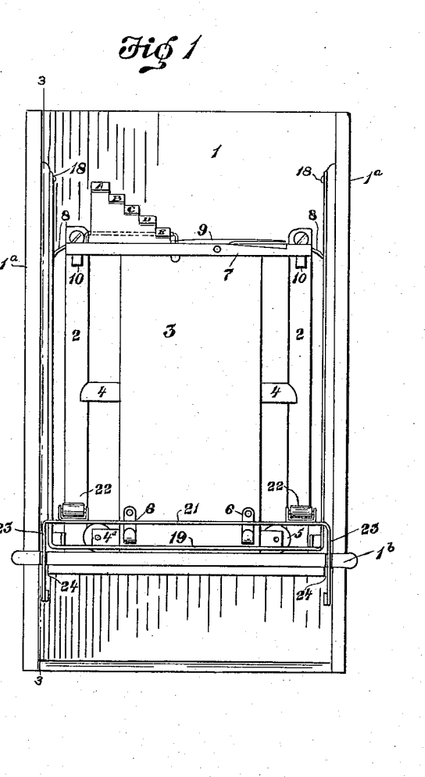
Figure 1 is a front elevation of the case with the pack of frames removed therefrom.
Figure 2:
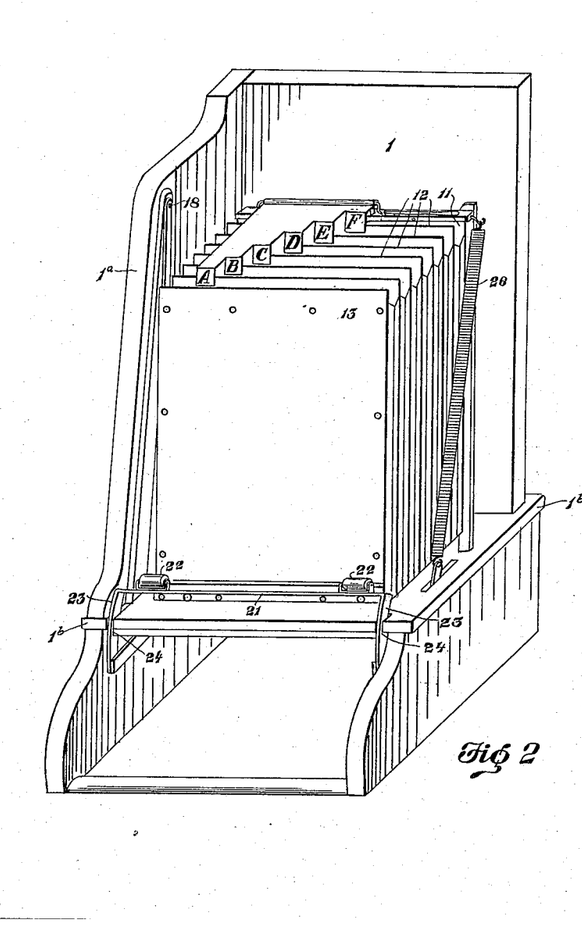
Fig. 2, a perspective view of the case with the pack of frames therein, and having one side broken away to show details.
Figure 3:
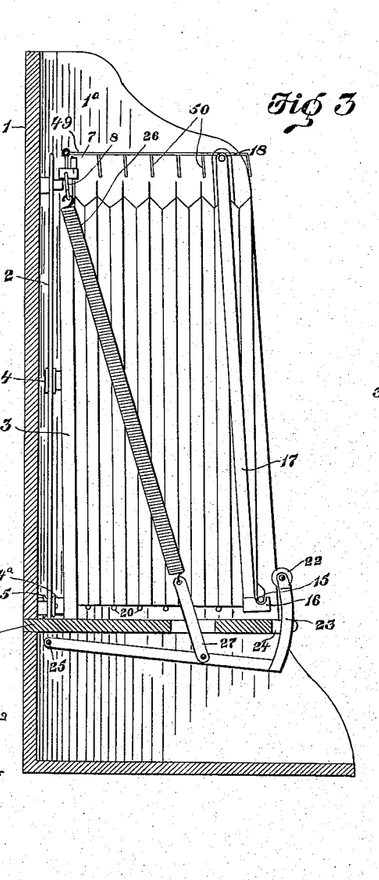
Fig. 3, a section of the case on line 3—3, Fig. 1, showing the pack of frames in the case in normal upright position.

The case of the appliance is preferably made with the back and side walls 1 and 1ª, and the transverse partition or shelf 1ᵇ located slightly above the lower ends of the walls; and the upright guides or ways 2 are secured in the case, preferably to the back wall thereof, as shown. The sliding bracket 3 is provided with the lateral arms 4 and 4ª, adapted to engage and travel along the ways, either with or without the flanged wheels 5 shown on the arms 4ª; which arrangement permits the bracket to slide or travel upward and downward in the case. The body of the sliding bracket is preferably inclined slightly backward from below upward, and the hooks 6 are provided on the forward side of its lower end, while the forwardly and laterally overhanging bar 7 is secured on its upper end; to the ends of which overhanging bar are secured the hooks 8, and intermediate the ends thereof is pivoted the latch 9. The stops 10 may be provided on the ways, or the shelf 1ᵇ can be utilized, to limit the downward movement of the bracket.

Figure 4:
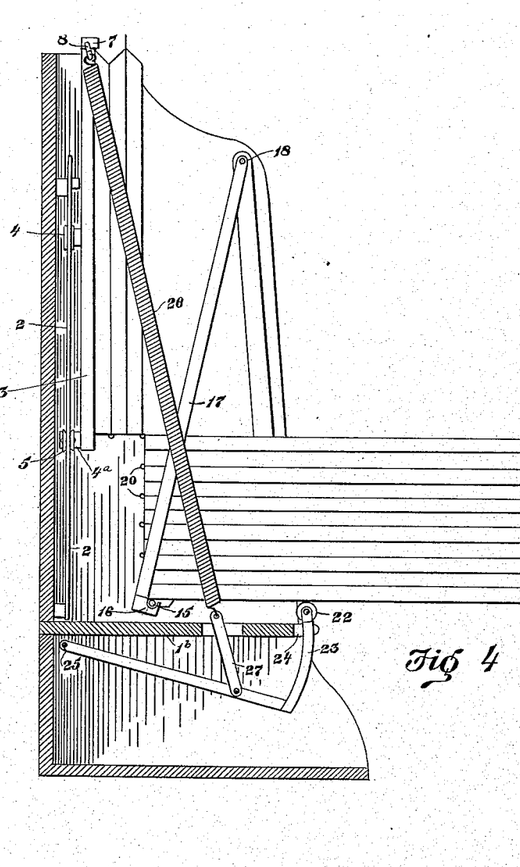
Fig. 4, a similar section of the case showing the pack of frames therein with a number of the frames rotated forward to a prone position.

The frames or leaves 11, 12 and 13, are normally assembled in a rectangular pack, and the rearmost frame 11 is provided with suitable sockets 14 in its lower end, to engage the hooks 6 on the lower end of the sliding bracket; and the upper end of the same frame is adapted to be engaged by the latch 9, thus detachably securing the rearmost frame in an upright position to the sliding bracket, so that it will travel upward and downward therewith. The laterally extending pivots 15 are provided on the lower end of the foremost frame 13, preferably on the forward side thereof; and swinging bearings 16 for these pivots are carried by the pendent links 17, the upper ends of which links are pivoted or otherwise supported on the side walls of the case as at 18. The lower ends of the links 17 are preferably connected by the yoke 19, thus forming a U-shaped bail in which the frames are adapted to operate. The frames of the pack are jointed together at the lower ends by the hinges 20, and it is evident that when the pack is uprightly positioned it can be placed in the case by engaging the sockets 14 in the lower end of the rearmost frame with the hook 6 on the lower end of the sliding bracket, and by engaging the upper end of the same frame with the latch on the upper end of the bracket; and that by engaging and supporting the lateral pivots on the lower end of the foremost frame in the swinging bearings of the pendent links, all the frames, except the rearmost one, can be severally or together rotated to a prone position, and that in so doing the pivot support of the foremost frame will swing or oscillate rearward, according to the number of frames rotated, and that the upright frames will, at the same time, be moved upward a corresponding distance; and vice versa.

A counterbalancing support, in the form of the cross-bar 21 with the bearing rollers 22 thereon, is preferably provided for the forwardly rotated frames, which cross-bar is depressibly connected to the case as by means of the arms 23 on the ends, which arms extend downwardly through the slots 24 in the forward edge of the shelf 1ᵇ, and have their rear ends pivoted to the side walls 1ª of the case at 25.

The expansion springs 26 are connected above to the hooks 8 on the ends of the overhanging bracket bar 7, and at their lower ends to the pivot arms of the depressible support, as by means of the links 27 extending through the slots 24 in the shelf 1ᵇ, so that a depression of the cross-bar 21 operates against the resistance of these springs. The roller bearings 22 on the cross-bar 21 are normally located in front of the lower end portion of the foremost frame, and it is evident that when one or more frames are rotated forward the face of the foremost frame will impinge these rollers and force the cross-bar downward against the action of the expansion springs until the cross-bar is stopped by contact with the shelf 1ᵇ, and at the same time the frame will travel rearward on the rollers, and furthermore that the swinging pivot bearing of the foremost frame serves as a fulcrum, and the hinged connections between the lower ends of the frames serve as knuckle joints, by means of which the upright frames are raised upward as the several frames are rotated forward, which upward movement is likewise against the action of the expansion springs, the pull of which is thus increased according to the number of frames which are rotated forward. It is also evident that, as the several frames are rotated forward, the foremost frame will travel rearward on the roller bearing supports, so that the action of the expansion spring, operating through the roller bearings, supports the prone frames at a varying distance forward from the fulcrum formed by the swinging bearings, depending upon the number of frames which have been rotated forward, whereby the expansion springs are rendered more effective to draw the forwardly rotated frames into their upright position after they have been started upward to pass the dead center formed by the knuckle joint between the respective frames.

Figure 6:
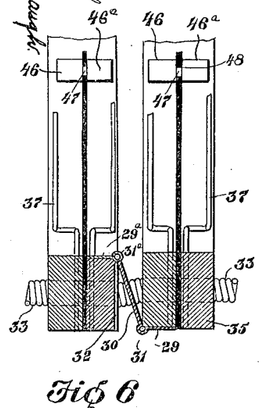
Fig. 6, a fragmentary sectional view of the hinged joint between two of the frames.
Figure 7:
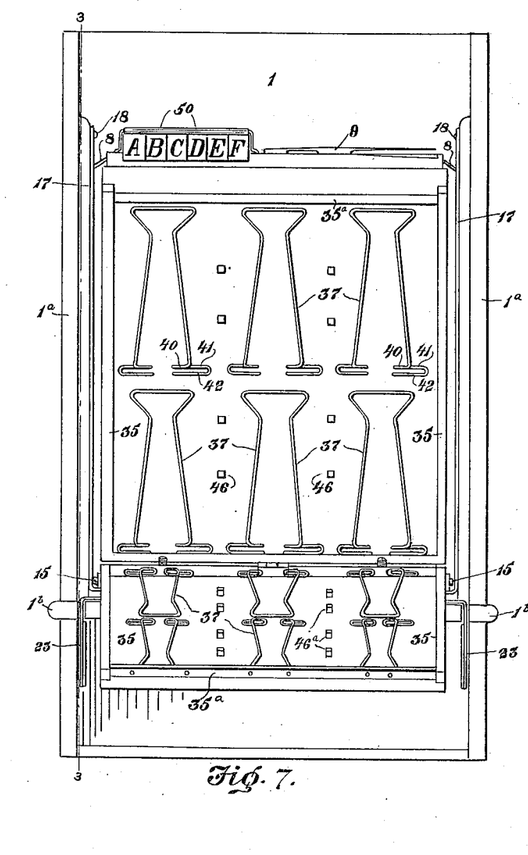
Fig. 7, a front elevation of the filing appliance with the pack of frames therein, showing the foremost frame rotated forward to its prone position.

Each hinge 20 between the lower ends of the frames of the pack is composed of the pivoted plates 29 and 29ᵃ with the intervening link-plate 30, and the parts are so connected and arranged that the pivot 31 of the plate 29 is located at the edge of the lower end of one frame, and the pivot 31ᵃ of the plate 29ᵃ is located in the face of the adjoining frame at a substantial distance above the lower edge thereof; and a suitable recess as 32 is preferably provided in the face of one frame to receive the link-plate so that the frames can be folded closely together. By this construction and arrangement, it is evident that the jointed ends of the frames may be slightly separated by a swinging of the link-plate upon its pivots, as shown in Figs. 6 and 7, and that the endwise movement of the frames with respect to each other, caused by this swinging, is so slight as to be negligible.

Figure 5:
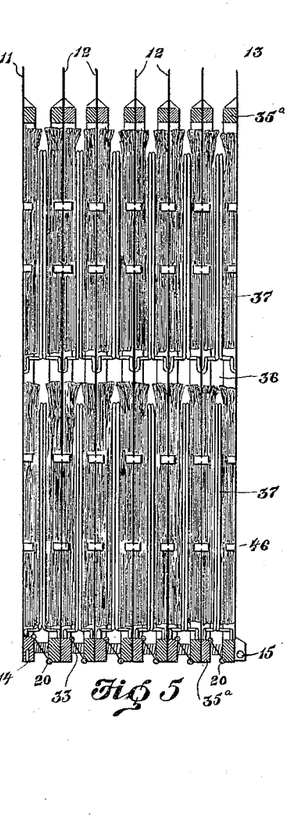
Fig. 5, a sectional view of the pack of frames in upright position, showing bunches of bills therein and the hinged ends expanded apart.
Figure 8:
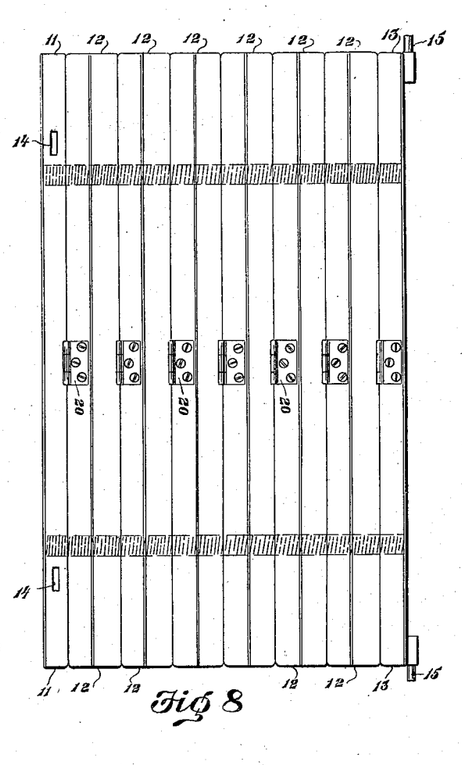
Fig. 8, an end view of the pack of frames, showing the jointed ends of the several frames in their normal closed-together relation.

The joint springs 33 may be provided for normally holding the hinged ends of the frames together, and, when used, these springs are preferably in the form of expansion springs, as shown, located in suitable apertures 34 provided in the lower end portions of the frames; and the ends of these springs are secured to the foremost and rearmost frames so that the tension of the springs acts to draw the hinged ends of the frames together, it being evident that the flexibility of these springs permits the frames to be rotated on their hinged joints.

The frames 11, 12 and 13 are preferably made of metal sheets or plates, with the reinforcing side and end strips 35 and 35ᵃ secured on their faces, which strips serve to stiffen as well as to separate the frame plates, and also constitute a rim within which are formed the recesses 36 in the faces of the frames for receiving the bunches of bills to be filed in the appliance.

Figure 9:
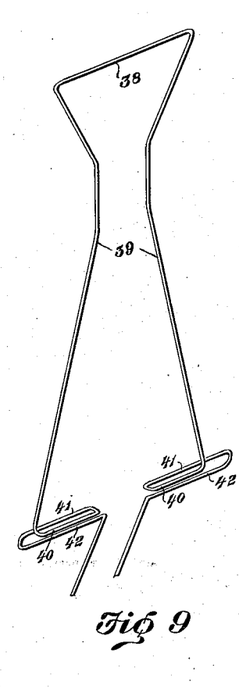
Fig. 9, a detached perspective view of the form of wire spring clip adapted to be secured to the rim of the flange.
Figure 10:
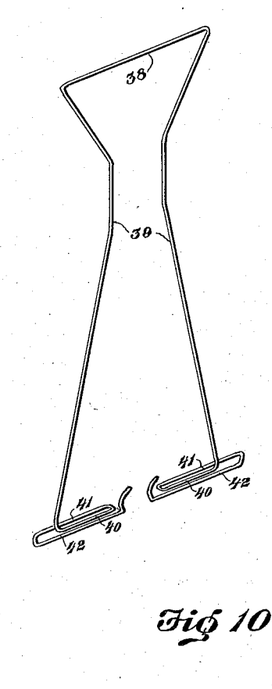
Fig. 10, a detached perspective view of the form of wire spring clip adapted to be secured to the sheet metal plate of the frame.

The spring clips 37 are secured to the frames within the recess formed by the reinforcing strips, and each spring is preferably composed of an integral wire bent to form a yoked upper or free end 38 with two lateral legs 39. The lower ends of the legs are bent or curved, first inward in the plane of the legs to form the transverse leg-shanks 40, thence laterally to the plane of the legs and outward to form the transverse spring-shanks 41 which are located at an interval alongside of and substantially parallel with the leg shanks, and preferably extend beyond the outer ends thereof; thence downward and inward to form the transverse base-shanks 42, which are located at an interval below and substantially parallel with the spring shanks and preferably extend inward to or beyond the inner ends thereof; and thence the free ends are bent or curved longitudinally to form the securing-shanks 43 or 43ᵃ by means of which the clip is fastened to the frame, either downward by being inserted in apertures 44 in the rim of the frame, or upward to be secured through apertures 44 in the rim of the frame, or upward to be secured through apertures 45 in the metal plate of the frame; in either case the longitudinal securing shanks are inclined to or from the plane of the legs so as to cause the yoked end of the clip to impinge by springing against the metal plate of the frame when the clip is secured thereto.

The parts are so proportioned and arranged that, when the clips are secured to the frames, the base shanks 42 and the spring shanks 41 will normally lie along the face of the metal plate, while the leg shanks and the lower ends of the legs will be normally located in the plane of the face of the reinforcing strips, thus leaving a substantial interval between the lower ends of the legs and the metal sheet, which forms a socket to receive a bunch of bills; it being understood that the yoked ends of the clips are normally deflected backward to press against the face of the metal sheet or intervening bills; and it is also evident that the compound spring formed by the several shanks not only serves to resiliently resist the outward rotation of the yoked end of the clip and thereby serves to hold an inserted bunch of bills in place, but also permits the lower ends of the legs to be sprung outward to increase the interval between these ends and the metal plate, and increasing the depth of the socket for receiving a thicker bunch of bills than could be received in the normal interval.

The separating posts 46 and 46ª are secured to the faces of the metal frame plate and are preferably made in the form of bolts of which the heads form the posts 46 on one side of the metal plate, the shanks 47 extend through suitable apertures 48 in the metal plate, and the nut forms the posts 46ª on the other face of the metal plate. The posts are alined at intervals in series intervening between the respective spring clips, and serve to separate the edges of inserted bills from each other, but at the same time permit said edges to be grasped by a finger inserted between the posts.

The index plate 49 is preferably hinged to the overhanging cross-bar 7 on the upper end of the sliding bracket 3, which plate normally extends forward and overhangs the upper ends of the frames when the same are inserted in the case in upright position. The forward edge of the index plate is notched in the form of steps, and from the forward edges of the notches are provided the depending flanges 50 which are arranged in echelon to overhang the upper end edge of the respective frames. The several flanges are marked by suitable characters as A, B, C, D, etc., to indicate the contents of the corresponding frame, and it is evident that the same can be readily located and grasped by placing the finger alongside the corresponding flange. It will be understood that the index plate is preferably arranged to be rotated upward on its hinged connection with the sliding bracket, when the pack of frames is being removed from or re-inserted in the case.

It will be noted that I have provided means for supporting a series of pivotally-connected-together frames whereby, in the normal operation of the frames, the foremost frame of the series is supported and guided to and fro in a curvilinear path. This is accomplished in such manner as to have the distance between the rearmost frame of the series and the front edges of the frame which may be reclined from time to time vary in accordance with the number of frames reclined, it being greatest when only the foremost frame alone of the series is rotated into prone position. It will also be understood that the tension of the counterbalancing spring is automatically increased as the number of frames rotated into prone position is increased, and that at the same time the lever action of the counterbalancing means is automatically increased or varied as the number of frames which are rotated into prone position is increased.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

I claim:

1. An appliance having pendent bearings in its forward portion, a series of vertically movable normally upright frames having their lower ends jointed together and an upright slide guide engaging the rearmost frame, there being connections between the lower end of the foremost frame and the pendent bearings, whereby a rotation of the several frames moves the rotated frames to and fro and the upright frames upward and downward.

2. An appliance having pendent bearings in its forward portion, a series of vertically movable normally upright frames having their lower ends jointed together, and an upright slide guide engaging the rearmost frame, there being pivots on the lower end of the foremost frame engaged in the pendent bearings, whereby a rotation of the several frames moves the rotated frames to and fro and the upright frames upward and downward.

3. An appliance having pendent bearings in its forward portion, a series of vertically movable normally upright frames having their lower ends jointed together, and an upright slide guide engaging the rearmost frame, there being connections between the lower end of the foremost frame and the pendent bearings, whereby a forward rotation of the several frames moves the rotated frames rearward and the upright frames upward, and vice versa.

4. An appliance having pendent bearings in its forward portion, a series of vertically movable normally upright frames having their lower ends jointed together, and an upright slide guide engaging the rearmost frame, there being pivots on the lower end of the foremost frame engaged in the pendent bearings, whereby a forward rotation of the several frames moved the rotated frames rearward and the upright frames upward, and vice versa.

5. An appliance having oscillating bearings in its forward portion, a series of vertically movable normally upright frames having their lower ends jointed together, and an upright slide guide engaging the rearmost frame, there being connections between the lower end of the foremost frame and the oscillating bearings, whereby a rotation of the several frames swings the rotated frames to and fro and the upright frames upward and downward.

6. An appliance having oscillating bearings in its forward portion, a series of vertically movable normally upright frames having their lower ends jointed together, and an upright slide guide engaging the rearmost frame, there being pivots on the lower end of the foremost frame engaged in the oscillating bearings, whereby a rotation of the several frames swings the rotated frames to and fro and the upright frames upward and downward.

7. An appliance having oscillating bearings in its forward portion, a series of vertically movable normally upright frames having their lower ends jointed together, and an upright slide guide engaging the rearmost frame, there being connections between the lower end of the foremost frame and the oscillating bearings, whereby a forward rotation of the several frames swings the rotated frames rearward and the upright frames upward, and vice versa.

8. An appliance having oscillating bearings in its forward portion, a series of vertically movable normally upright frames having their lower ends jointed together, and an upright slide guide engaging the rearmost frame, there being pivots on the lower end of the foremost frame engaged in the oscillating bearings, whereby a forward rotation of the several frames swings the rotated frames rearward and the upright frames upward, and vice versa.

9. A case having pendent bearings in its forward portion and a series of normally upright frames having their lower ends jointed together, there being a guiding connection between the rearmost frame and the case and an engagement between the lower end of the foremost frame and the bearings, whereby a rotation of the several frames moves the upright frames and the rotated frames to and fro in respective paths at an angle to each other.

10. A case having pendent bearings in its forward portion and a series of normally upright frames having their lower ends jointed together, there being a guiding connection between the rearmost frame and the case and pivots on the lower end of the foremost frame engaged in the bearings, whereby a rotation of the several frames moves the upright frames and the rotated frames to and fro in respective paths at an angle to each other.

11. A case having pendent bearings in its forward portion and a series of normally upright frames having their lower ends jointed together, there being a guiding connection between the rearmost frame and the case and an engagement between the lower end of the foremost frame and the bearings, whereby a forward rotation of the several frames raises the upright frames and swings the rotated frames rearward, and vice versa.

12. A case having pendent bearings in its forward portion and a series of normally upright frames having their lower ends jointed together, there being a guiding connection between the rearmost frame and the case and pivots on the lower end of the foremost frame engaged in the bearings whereby a forward rotation of the several frames raises the upright frames and moves the rotated frames rearward, and vice versa.

13. A case having oscillating bearings in its forward portion and a series of normally upright frames having their lower ends jointed together, there being a guiding connection between the rearmost frame and the case and an engagement between the lower end of the foremost frame and the bearings, whereby a rotation of the several frames moves the upright frames and swings the rotated frames to and fro in respective paths at an angle to each other.

14. A case having oscillating bearings in its forward portion, and a series of normally upright frames having their lower ends jointed together, there being a guiding connection between the rearmost frame and the case and pivots on the lower end of the foremost frame engaged in the bearings, whereby a rotation of the several frames moves the upright frames and swings the rotated frames to and fro in respective paths at an angle to each other.

15. A case having oscillating bearings in its forward portion and a series of normally upright frames having their lower ends jointed together, there being a guiding connection between the rearmost frame and the case and an engagement between the lower end of the foremost frame and the bearings, whereby a forward rotation of the several frames raises the upright frames and swings the rotated frames rearward, and vice versa.

16. A case having oscillating bearings in its forward portion, and a series of normally upright frames having their lower ends jointed together, there being a guiding connection between the rearmost frame and the case and pivots on the lower end of the foremost frame engaged in the bearings whereby a forward rotation of the several frames raises the upright frames and swings the rotated frames rearward, and vice versa.

17. An appliance comprising a series of frames, pivotal connections between adjoining frames of the series, and supporting means for the frames comprising a device for guiding the lower end of the front frame in a curvilinear path and the rear frame at an angle to said front frame as any of the frames between said end frames are swung about their respective connecting pivots.

18. An appliance comprising a series of frames, pivotal connections between adjoining frames of the series, and supporting means for the series including devices engaging the front frame of the series and permitting it to move to and fro in a curvilinear path as the frames of the series are swung to and fro in normal operation.

19. A case having pendent bearings in its forward portion, a pack of normally upright frames having their lower ends jointed together, there being a sliding connection between the rearmost frame and the case and pivots on the lower end of the foremost frame engaged in the pendent bearings, whereby a forward rotation of the several frames raises the upright frames and moves the rotated frames rearward, and a spring sustained support normally in front of the lower end of the foremost frame, whereby the rotated frames are counterbalanced.

20. A case having pendent bearings in its forward portion, a pack of normally upright frames having their lower ends jointed together, there being a sliding connection between the rearmost frame and the case and pivots on the lower end of the foremost frame engaged in the pendent bearings, whereby a forward rotation of the several frames raises the upright frames and moves the rotated frames rearward, and a depressible support normally in front of the lower end of the foremost frame and having a spring connection with the rearmost frame, whereby the rotated frames are counterbalanced.

21. An appliance comprising a series of normally upright frames having the lower ends jointed together, movable pivotal supporting means for the jointed end of the foremost frame, and counterbalance means for the frames operative when one or more of the foremost frames are rotated into reclined position, including a spring sustained support upon which the reclined foremost frame moves to and fro when the superposed frames are operated.

22. An appliance comprising a series of normally upright frames having the lower ends jointed together movable supporting means for the jointed end of the foremost frame, and an additional support for the frames when one or more of the foremost frames are rotated into reclined position, including a spring sustained roller upon which the reclined foremost frame moves to and fro when the superposed frames are operated.

23. In a filing appliance, the combination with a casing, of a series of holders having pivotal connections between them, and means for supporting the holders in said casing, the said means permitting one end holder to slide relative to said casing as any of the holders between them are operated about their respective pivots, and the other end holder to swing relative to the casing during operation of any of the remaining holders.

24. In a filing appliance, the combination with a casing, of a series of holders having pivotal connections between them, and means for supporting the holders in said casing, the said means permitting one end holder to slide relative to said casing as any of the holders between them are operated about their respective pivots, and the other end holder to swing relative to the casing during operation of any of the remaining holders, the opposite end holders of the series being supported by said supporting means at fixed angles to each other during the operation of the holders.

25. In a filing appliance, the combination with a casing, of a series of holders having pivotal connections between them, and means for supporting the holders in said casing, the said means permitting one end holder to slide relative to said casing as any of the holders between them are operated about their respective pivots and the other end holder to swing relative to the casing during operation of any of the remaining holders, the opposite end holders of the series being supported by said supporting means at right angles to each other during the operation of the holders.

26. In a filing appliance, the combination of a casing, having a slideway, a series of holders having pivotal connections between them permitting the holders to swing from one position to another, one end holder of the series being arranged to slide on said slideway, and means for swingably supporting the opposite end holder of the series in the casing.

27. In a filing appliance, the combination of a casing having a slideway, a series of holders having pivotal connections between them permitting the holders to swing from one position to another, one end holder of the series being arranged to slide on said slideway, means for swingably supporting the opposite end holder of the series, and means permitting the holders to be detached from said swingable supporting means.

28. In an apparatus of the class described, the combination with a case, of a series of frames, connections between the frames permitting them to swing, one relative to the other, and means for supporting said frames in the case, the said means permitting one end frame of the series to move through the arc of a circle and the opposite end frame to slide upwardly and downwardly.

29. In an apparatus of the class described, the combination with a case having a back, of a series of frames, connections between the frames permitting them to swing relative to each other, and means for supporting said frames in the case, the said supporting means permitting one end frame of the series to move through the arc of a circle and the opposite end frame to slide upwardly and downwardly parallel to said back.

30. In an apparatus of the class described, the combination with a case having a back, of a series of frames, connections between the frames permitting them to swing relative to each other from one position to another, one end frame of the series having sliding engagement with said back, and means for swingably supporting the opposite end frame.

31. In an apparatus of the class described, the combination with a case having a back, of a series of frames having connections between them permitting them to swing from one position to another and relative to each other, the rear end frame of the series of frames having sliding engagement with said back, and means for swingably and pivotally supporting the front end frame.

32. The combination with a case, of a series of frames for supporting papers or slips, pivotal connections between the frames permitting them to swing relative to each other, and a cradle for swingably and pivotally supporting the front frame of the series.

33. The combination with a case having sides, of a series of frames having connections between them and permitting said frames to swing relative to each other from one position to another, and a U-shaped frame pivoted at its opposite ends to said sides and swingable in a vertical plane for swingably supporting one end frame of the series of frames.

EMERSON B. MOSELEY.

Witnesses:
RUTH A. MILLER.
RAY F. KOHL.

Copies of this patent may be obtained for five cents each, by addressing the "Commissioner of Patents Washington, D. C."